United States Patent [19]

Aguirre et al.

[11] Patent Number: 5,383,225
[45] Date of Patent: Jan. 17, 1995

[54] SYNCHRONIZER FOR TDMA ACQUISITION SIGNAL HAVING AN UNKNOWN FREQUENCY

[75] Inventors: Sergio Aguirre, Boulder, Colo.; Christopher R. Keate, Santa Clara, Calif.; Gregory B. Vatt, Mesa, Ariz.

[73] Assignee: Motorola, Inc., Schaumburg, Ill.

[21] Appl. No.: 991,816

[22] Filed: Dec. 17, 1992

[51] Int. Cl.6 .............................................. H04L 7/00
[52] U.S. Cl. ................................... 375/106; 375/107; 375/113; 370/105.1; 370/105
[58] Field of Search .................. 370/105, 105.1, 104.1, 370/93; 375/107, 110, 113, 106

[56] References Cited

U.S. PATENT DOCUMENTS

| | | | |
|---|---|---|---|
| 4,168,398 | 9/1979 | Matsuo et al. | 178/69.1 |
| 4,215,239 | 7/1980 | Gordy et al. | 375/114 |
| 4,227,252 | 10/1980 | Godard | 375/113 |
| 4,317,212 | 2/1982 | Van Gerwen et al. | 375/113 |
| 4,357,707 | 11/1982 | Delury | 375/110 |
| 4,555,782 | 11/1985 | Alaria et al. | 370/104 |
| 4,652,834 | 3/1987 | McAdam | 329/50 |
| 4,726,040 | 2/1988 | Acampora | 375/75 |
| 4,788,681 | 11/1988 | Thomas et al. | 370/105.1 |
| 4,941,155 | 7/1990 | Chuang et al. | 375/84 |
| 4,965,757 | 10/1990 | Grassart | 364/576 |
| 5,019,824 | 5/1991 | Kumar | 342/195 |
| 5,285,474 | 2/1994 | Chow et al. | 375/13 |

Primary Examiner—Stephen Chin
Assistant Examiner—Amanda T. Le
Attorney, Agent, or Firm—Gregory J. Gorrie; Robert M. Handy

[57] ABSTRACT

A synchronizer operates to achieve initial synchronization with a TDMA acquisition signal exhibiting a potentially large Doppler. The synchronizer collects samples of a baseband signal during a timing window. A fast Fourier transform (FFT) is performed on the samples to generate a set of spectral data. The window is moved to an identical point in a subsequent frame and the FFT repeated until a high-confidence spectral data set is obtained. If the spectral data set indicates energy concentrated around a discrete frequency, then that discrete frequency represents an estimate of the acquisition signal's frequency. The timing window's timing parameters represent a time slot estimate of the acquisition signal. If the spectral data set indicates energy spread more or less uniformly over the spectrum, then no estimates are indicated and a new window is positioned at a different point in subsequent frames.

21 Claims, 6 Drawing Sheets

SYNCHRONIZER FOR TDMA ACQUISITION SIGNAL HAVING AN UNKNOWN FREQUENCY

TECHNICAL FIELD OF THE INVENTION

The present invention relates generally to radio communications. More specifically, the present invention relates to stations which synchronize with time division multiple access (TDMA) signals presented by a potential plurality of carriers exhibiting unknown frequencies.

BACKGROUND OF THE INVENTION

Electronic messages are often communicated using TDMA techniques. Within a transmitted TDMA signal, diverse time slots are allotted to diverse channels or purposes. In other words, a single TDMA signal communicates many independent messages by interleaving the messages in time. Typically, each of the independent messages is assigned its own time slot within a frame of time. The frames are often of constant duration, and a message's time slot assignment often remains consistent from frame to frame. Synchronization refers to the process of causing two stations, for example a base unit and a mobile unit, to operate with a common time base so that each has a common understanding of time slot and framing definitions.

The synchronization process often has multiple stages wherein initial stages are dedicated to establishing a communication link between two stations and later stages utilize the communication link to refine the synchronization definition so that messages may be communicated as efficiently as possible. The present invention is concerned with the initial stages of synchronization. In these initial stages, a slave station, often a mobile unit, synchronizes itself to a time and/or frequency base of a master station, often a base unit. When multiple master stations are present, the initial synchronization stage selects the master station with which to synchronize. After the slave unit has acquired synchronization, the slave station then transmits an initial message to the selected master station.

Slave stations in conventional communication systems utilize well known filtering and phase lock loop circuits to acquire an acquisition signal broadcast by a master station. When the conventional slave station has extensive a priori knowledge of the characteristics of an acquisition channel over which the acquisition signal is broadcast, the initial synchronization can occur quickly. For example, when the slave station knows the acquisition channel's frequency with precision, initial synchronization occurs quickly. When a continuous wave (CW) acquisition channel is used and no time slot information needs to be resolved, initial synchronization occurs quickly. Likewise, when interference between multiple acquisition channels need not be considered, initial synchronization occurs quickly.

However, in situations where a TDMA acquisition channel is utilized and where the acquisition channel's frequency is not known or when multiple TDMA channels at different frequencies are present, conventional synchronization techniques fail to achieve a quick synchronization. This situation occurs in connection with a satellite-based cellular TDMA communication system in which satellites act as master stations and travel at speeds of up to 26,000 Km/Hr relative to the earth. In such a cellular system, extensive Doppler frequency uncertainty results from the fast satellite movement. Moreover, the passing of calls or communication channels between satellites without losing data, along with a desire to maximize user convenience, suggest a need for rapid initial synchronization.

SUMMARY OF THE INVENTION

Accordingly, it is an advantage of the present invention that an improved synchronization method and apparatus is provided.

Another advantage of the present invention is that a synchronizer is provided that quickly acquires a TDMA acquisition signal in spite of great frequency uncertainty.

Another advantage of the present invention is that a synchronizer is provided that selects among potentially interfering acquisition signals.

Yet another advantage is that the present invention performs a two-dimensional search, in both frequency and time, to identify an acquisition signal.

The above and other advantages of the present invention are carried out in one form by a method for synchronizing a slave station to a TDMA communication signal having an unknown frequency and an unknown time slot within frames of data. The method establishes an origin for a timing window. Next, the method determines the spectral content of the communication signal within the timing window. This spectral content is monitored, and a subsequent origin for the timing window is identified. The subsequent origin is not an integral number of frames delayed from the originally established origin. The method repeats the determination of spectral content, the monitoring of spectral content, and the identifying of subsequent origins. When the step of monitoring the spectral content detects energy concentrated around a discrete frequency, the repetitions may cease.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
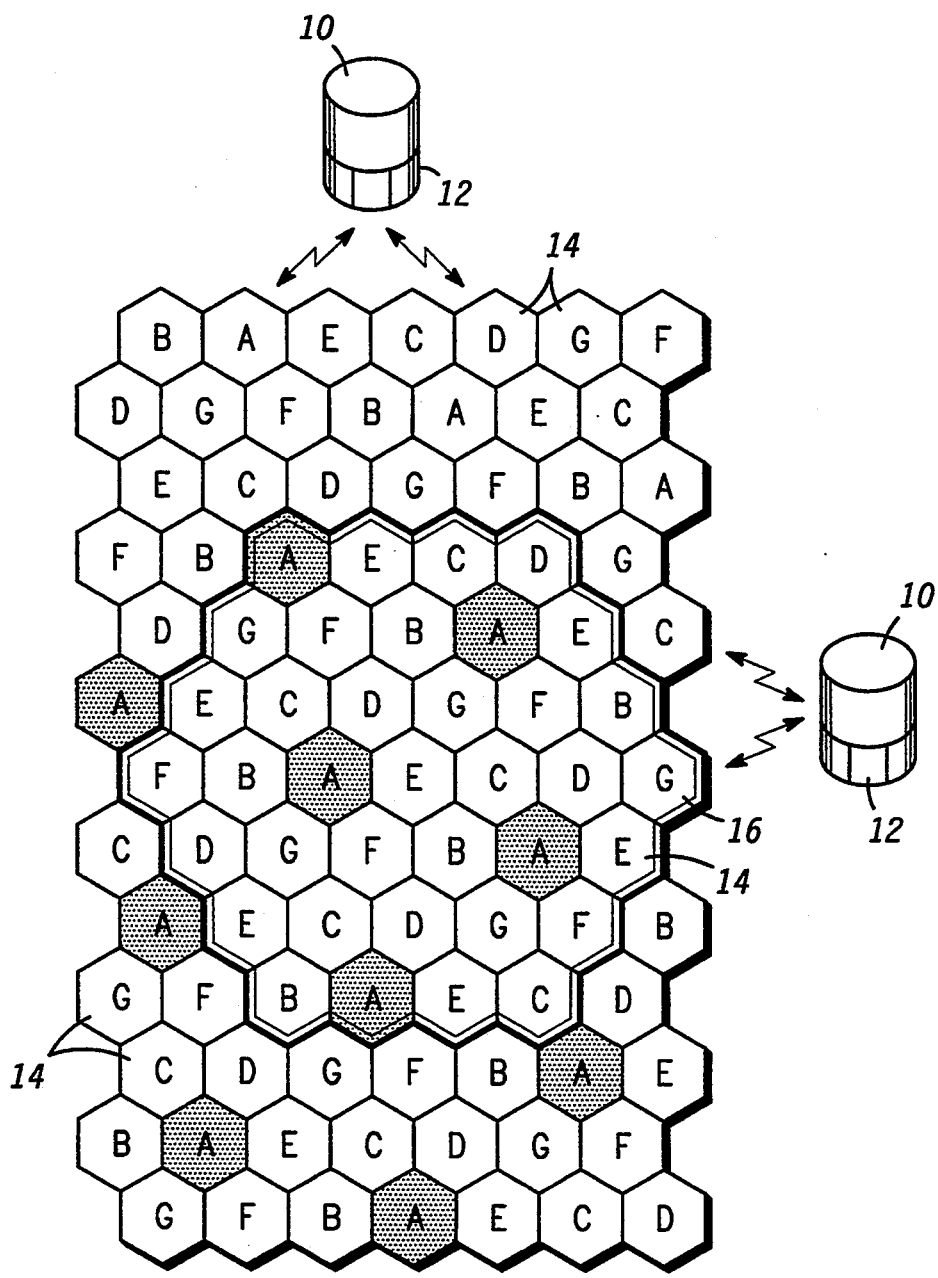
FIG. 1 shows a diagram of a pattern of cells that illustrates the environment within which the preferred embodiment of the present invention operates.

Referring to FIG. 1, the preferred embodiments of the present invention are capable of operating in connection with a space-based cellular communication system. This communication system uses numerous satellites 10 orbiting the earth and traveling with respect to the earth at speeds of up to 26,000 Km/Hr. Each satellite 10 includes an array 12 of directional antennas. Each array 12 projects numerous discrete antenna patterns on the earth's surface at numerous diverse angles away from its satellite 10. FIG. 1 shows a diagram of a resulting pattern of cells 14 that satellites 10 collectively form on the surface of the earth. A region 16, which is bounded by a double line in FIG. 1, results from the antenna patterns produced by an antenna array 12 of a single satellite 10. Cells 14 which reside outside of region 16 are produced by antenna arrays 12 from other satellites 10.

Since satellites 10 travel at speeds of up to 26,000 Km/Hr with respect to the earth, cells 14 also travel over the earth at close to this speed. At this speed, any given point on the surface of the earth resides within a single cell 14 for no more than around one minute and within a single satellite's region 16 for no more than around nine minutes. When a cell boundary approaches an earth-based station (not shown), the earth-based station is passed off to another cell. This passing off often requires the earth-based station to communicate with an entirely different satellite.

The communication system within which the preferred embodiments of the present invention operate utilizes numerous frequency channels. Thus, this communication system employs a frequency division multiple access (FDMA) scheme so that numerous independent communication links may be established simultaneously. The entire spectrum of these numerous frequency channels is available within each cell. For example, a seven-cell frequency reuse pattern, depicted in FIG. 1, may be implemented using TDMA techniques to prevent interference between adjacent cells. In other words, while the entire spectrum is available in each cell, adjacent cells are assigned different time slots within which that spectrum may be used. Frames are defined to include at least seven different time slots to correspond to the seven-cell reuse pattern. Cells 14 labeled with the letter "A" in FIG. 1 are assigned one time slot, cells 14 labeled with the letter "B" are assigned another time slot, and so on. That way, cells 14 which utilize the same spectrum at the same time are geographically spaced apart from one another. While FIG. 1 illustrates a seven-cell, seven time slot arrangement, those skilled in the art will understand that a larger or smaller reuse pattern can also be used.

Figure 2:
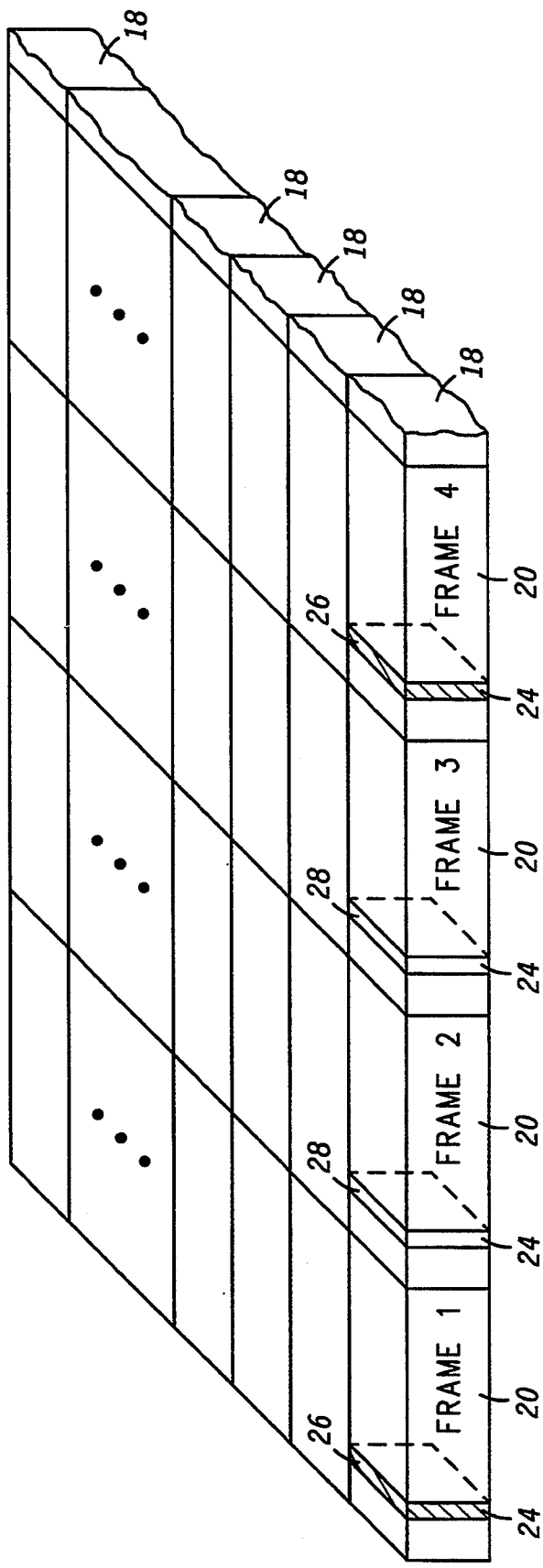
FIGS. 2-3 illustrate a combined FDMA/TDMA communication scheme within which the preferred embodiment of the present invention operates.
Figure 3:
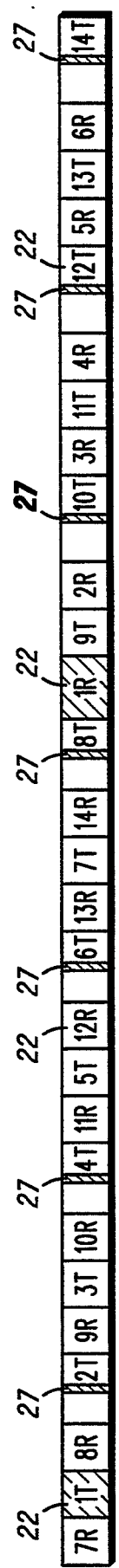

FIGS. 2-3 illustrate the resulting combined FDMA/TDMA communication scheme in more detail. With reference to FIG. 2, each of numerous diverse frequency channels 18 is divided in time into frames 20, four of which are shown in FIG. 2. Frames 20 are of constant duration. FIG. 3 shows a single frame 20. Each frame 20 is divided into numerous duplex time slots 22. FIG. 3 depicts fourteen of time slots 22 in a single frame 20. These fourteen time slots 22 are referred to in FIG. 3 with the numerals 1-14 followed by either a "T" for transmit or an "R" for receive. The transmit and receive intervals of each time slot 22 are named from the perspective of a satellite 10. Corresponding transmit and receive portions are remotely located from one another within each frame 20 and are of different durations. Thus, for example, one of duplex time slots 22 includes an interval 1T and a remotely located interval 1R, another of duplex time slots 22 includes an interval 2T and an interval 2R, and so on.

With reference to FIGS. 2 and 3, in the preferred embodiments at least a portion of these fourteen time slots are permanently allocated to implementing the above-discussed seven-cell frequency reuse pattern. Of course, frequency channels 18 may be separated from one another by suitable frequency guard bands, and transmit and receive portions of time slots 22 may be separated from one another by suitable guard times.

Preferably, all messages are digitally encoded using quadrature phase shift keying (QPSK) techniques and transmitted within their own assigned communication channels 24. Each communication channel 24 is defined by the combination of a specific frequency channel 18 and a specific time slot 22. An assigned time slot 22 occupies the same position from frame 20 to frame 20.

One of communication channels 24 is dedicated to being an acquisition channel. This acquisition channel is utilized by the present invention for synchronization. Preferably, each of satellites 10 and cells 14 (see FIG. 1) utilize a common frequency channel 18 for the acquisition channel. Of course, the acquisition channel's time slot 22 varies in accordance with the particular cell 14 within which the acquisition signal is being communicated.

In a first embodiment of the present invention, satellites 10 transmit an unmodulated carrier during a first portion 26 of frames 20 and transmit either nothing or a carrier modulated with data over a second portion 28 of frames 20. Portions 26 and 28 are distributed at regular intervals so that each frame 26 is followed by a predetermined number, illustrated in FIG. 2 as two, of frames 28, then the pattern repeats. Of course, those skilled in the art will appreciate that in some applications first portion 26 may occupy all of frames 20.

Preferably, the pure carrier is transmitted only during predetermined segments 27 of the time slots allocated to allocation channels. Data transmitted over second portion 28 and over first portion 26 outside of segment 27 preferably identify a specific satellite 10 and cell 14, or any other data advantageous to the application. As discussed above, different time slots 22 within a frame 26 may serve as different acquisition channels for different cells 14 (see FIG. 1). Moreover, the time slots 22 may be broadcast from different satellites 10 (see FIG. 1) located different distances away from a receiver of the acquisition signals. Due to differences in these distances, signal propagation delay may cause diverse time slot channels 22 from diverse satellites to overlap at the receiver. However, such diverse time slot channels are characterized by diverse Doppler signatures. Preferably, segments 27 are relatively narrow compared to the entire duration of a transmit time slot 22. The narrow width of segments 27 aids in distinguishing overlapping acquisition channels, as discussed below.

In a second embodiment, satellites 10 do not transmit an unmodulated carrier, but are guaranteed to transmit data during all frames 20 for a particular frequency channel 18.

Figure 4:
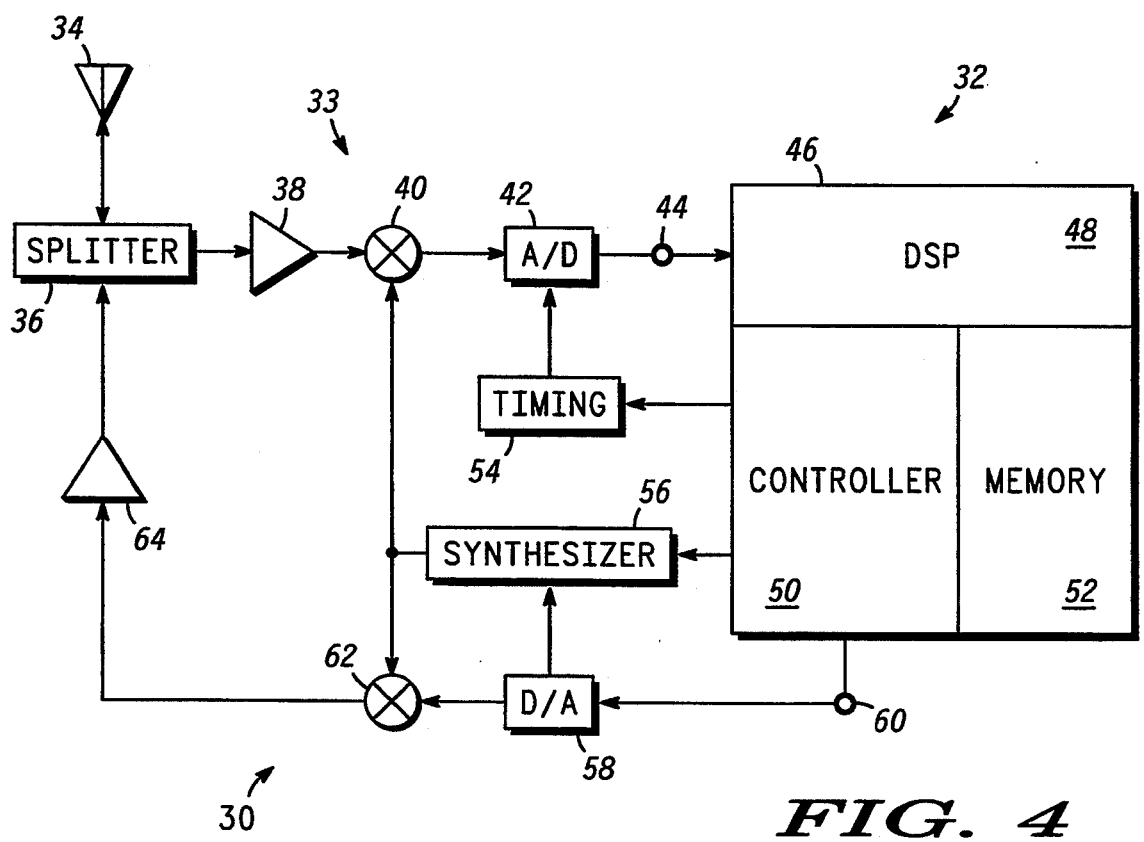
FIG. 4 shows a block diagram of a radiocommunication station that incorporates a synchronizer constructed in accordance with the teaching of the present invention.

FIG. 4 shows a block diagram of a slave radiocommunication station 30 that incorporates a synchronizer 32 constructed in accordance with the teaching of the present invention. Station 30 is preferably located on the surface of the earth or in the atmosphere in accordance with the communication system discussed above in connection with FIGS. 1-3, and station 30 may be a portable or mobile unit.

A receiver section or portion 33 of station 30 includes an antenna 34, which is configured to transmit and receive any of the numerous frequency channels employed by the communication system. Antenna 34 couples to a first port of a signal splitter 36, and a second port of splitter 36 couples to an input of an RF amplifier 38. An output of amplifier 38 couples to a first input of a down-conversion mixer 40, and an output of mixer 40 couples to an analog input of an analog-to-digital (A/D) circuit 42. Thus, mixer 40 converts a received signal into a baseband analog signal, and A/D circuit 42 digitizes this baseband analog signal by collecting samples thereof. A data output of A/D circuit 42 couples through a port 44 to a data input of a digital processing section 46. The received signal may be provided from port 44 to other portions (not shown) of station 30.

Section 46 includes a digital signal processor (DSP) 48 that receives and processes the digital samples collected by A/D circuit 42. This processing includes modulation and demodulation of QPSK encoded data and the performance of Fast Fourier transforms (FFTs) on sets of samples collected by A/D circuit 42. DSP 48 is preferably implemented using a conventional DSP semiconductor chip. DSP 48 is controlled by, and in data communication with, a controller 50, which may be implemented using a conventional microprocessor circuit. Controller 50 and DSP 48 are both in data communication with a memory 52. Those skilled in the art will appreciate that memory 52 permanently stores programming instructions which define the processes performed by station 30 and by controller 50 and DSP 48. In addition, memory 52 temporarily stores data generated by A/D 42, DSP 48, and controller 50 while performing such processes. These temporarily stored data include sets of spectral data generated by DSP 48 as a result of performing FFTs.

Controller 50 of section 46 has a first control output which drives a timing circuit 54 and a second control output that drives a conventional synthesizer 56. An output of timing circuit 54 couples to a control input of A/D circuit 42. Timing circuit 54 may be constructed using conventional timer or counter circuits that are programmed by controller 50. Through timing circuit 54, timing windows are defined. These timing windows specify timing parameters utilized by A/D circuit 42 in collecting samples. In particular, timing circuit 54 specifies when A/D circuit 42 starts collecting a set of samples, the period of time which elapses between consecutive samples, and the duration of the timing window or number of samples to collect.

Another output from section 46, and preferably from controller 50 thereof, provides digital data to a data input of a digital-to-analog conversion circuit 58 through a port 60. D/A circuit 58 converts this digitized data into analog data. In addition, other portions (not shown) of station 30 may provide data to D/A circuit 58 through port 60 for transmission. An analog output of D/A circuit 58 couples to a first input of an up-conversion mixer 62, and an output of mixer 62 couples to an input of an RF power amplifier 64. An output of power amplifier 64 couples to a third port of signal splitter 36, and through splitter 36 to antenna 34.

Synthesizer 56 is capable of generating an oscillating signal at any frequency within the spectrum of frequency channels used by the present invention. This oscillating signal is routed to second inputs of mixers 40 and 62. The second control output from controller 50 defines the frequency of this oscillating signal.

Those skilled in the art will appreciate that the block diagram presented in FIG. 4 may be altered while still achieving the functions indicated in FIG. 4. For example, mixers 40 and 62 may employ multiple stages for converting between baseband and RF. Likewise, timing circuit 54 may be incorporated within controller 50, so that controller 50 directly controls the timing operations of A/D circuit 42. Moreover, A/D circuit 42 may continuously sample analog baseband signals and store such samples in memory 52 while DSP 48 and controller 50 are configured to process only those samples which occur during the above discussed timing windows, ignoring other samples.

Figure 5:
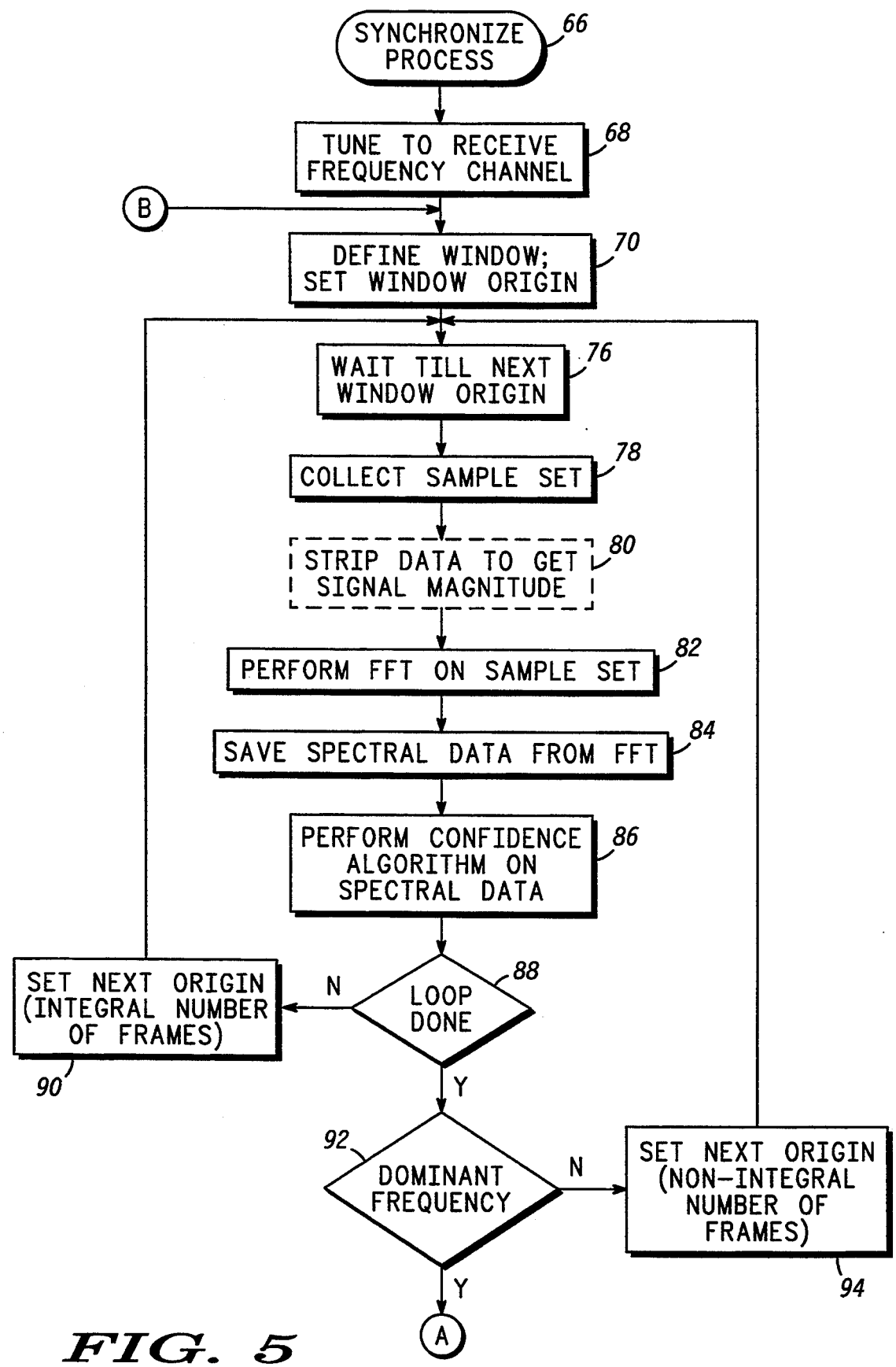
FIGS. 5-6 together show a flow chart of a synchronization process performed by the radio communication station illustrated in FIG. 4.
Figure 6:
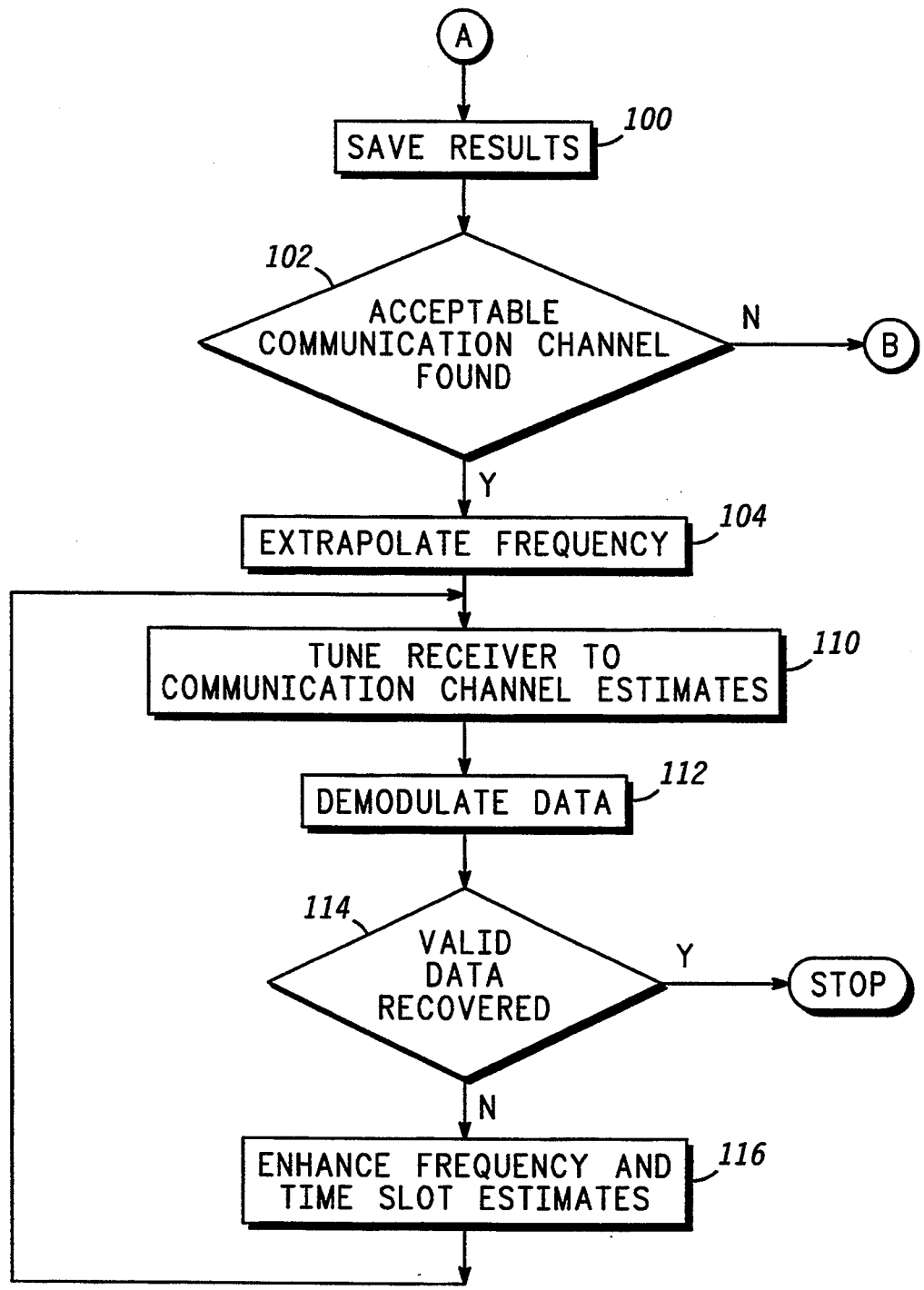

FIGS. 5-6 show a flow chart of a process or method 66 performed by synchronizer 32 of station 30 (see FIG. 4) in synchronizing with the above-discussed acquisition signals. Synchronization process 66 is performed whenever station 30 needs to acquire synchronization. This need occurs, for example, whenever station 30 is powered up or whenever station 30 has temporarily lost its signal from a satellite 10 (see FIG. 1). Rapid synchronization is a convenience to the user of station 30 so that communication can take place quickly and so that any loss in communication is minimized.

In addition, this need occurs whenever a communication channel is passed from a cell 14 to another cell 14 (see FIG. 1) and from a region 16 to another region 16 (see FIG. 1). When a communication channel is being passed from cell 14 to cell 14, instructions from a satellite 10 to station 30 inform station 30 of an upcoming channel hand-off to occur within a few frames 20 (see FIG. 2). Synchronization should occur before the expiration of these few frames so that no data will be lost when the hand-off occurs. When the hand-off occurs between regions 16, the synchronization conditions are especially severe. Different satellites 10 are located different distances from station 30 and are probably moving in different directions relative to station 30. Accordingly, a cell 14 in a new region 16 has different and unknown time slot and Doppler characteristics from those of a current cell 14 and region 16. These unknown Doppler and time slot characteristics make synchronization within a few frames exceedingly difficult.

With reference to FIGS. 4 and 5, process 66 performs a task 68 to tune receiver section 33 of station 30 to receive a predetermined frequency channel 18 (see FIG. 2). Preferably, this frequency channel 18 is one that carries the acquisition signal. Task 68 accomplishes the tuning operation when controller 50 instructs synthesizer 56 to output an oscillation signal that causes mixer 40 to output a baseband signal from a received signal exhibiting the acquisition signal's approximate frequency. In the preferred embodiment, Doppler uncertainty causes this baseband signal to exhibit any frequency within a ±38 Khz spectrum. It is desirable that synchronizer 32 resolve the Doppler to within around 600 Hz in order to correctly demodulate data. This is explained more fully below.

Figure 7:
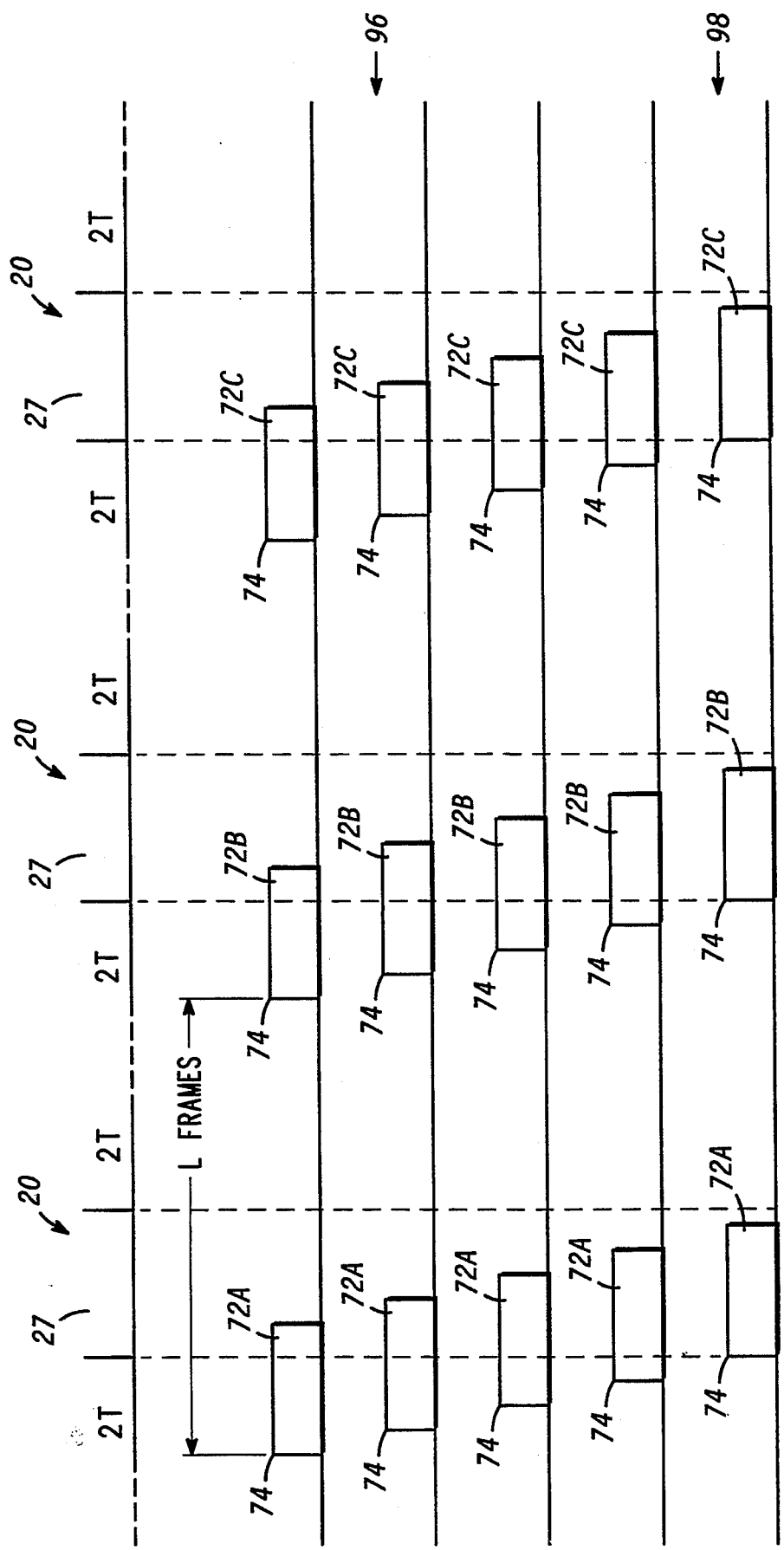
FIG. 7 shows a timing chart of sample data sets collected and processed by the preferred embodiment of the present invention.

After task 68, a task 70 establishes a definition for an original timing window 72a, examples of which are shown in a timing chart presented in FIG. 7. By establishing this definition, the parameters which define a set of digitized baseband samples are specified. In particular, controller 50 specifies the duration of timing window 72a, the number of samples to include in window 72a, and an origin or beginning point 74 of window 72a. The duration is preferably set to a value which is slightly shorter than the duration of segment 27. That way, for the first embodiment discussed above, the entire timing window may fit within segment 27. When window 72a has been defined, timing circuit 54 performs a task 76. During task 76, synchronizer 32 waits until the specified origin 74 of the specified window 72 occurs, where window 72 refers to any of specific timing windows 72a, 72b, or 72c shown in FIG. 7. When task 76 determines that the current time corresponds to the specified origin 74, A/D circuit 42 performs a task 78 to collect a set of digitized samples. This set of samples is taken only during the specified window 72.

After task 78, processing section 46 performs an optional task 80 (shown in phantom in FIG. 5) when the above-discussed second embodiment of the acquisition channel is used. As mentioned above, the second embodiment does not employ an unmodulated or pure carrier in the acquisition channel. Rather, a channel which serves as the acquisition channel for the purposes of task 68, discussed above, is guaranteed to continuously transmit data. Task 80 strips any such data from the sample set collected in task 78. Those skilled in the art will appreciate that the stripping of data may be accomplished by a quadrupling operation for QPSK encoding. However, a 12 dB reduction in signal-to-noise (S/N) ratio may be expected as a result of this operation. Task 80 is not performed when the first embodiment of the acquisition channel is used. This first embodiment employs an unmodulated carrier during segment 27 of an acquisition channel's time slot. Consequently, data does not have to be removed from the acquisition signal during segment 27, a sharp temporal boundary at the beginning and end of segment 27 exists, and the 12 dB loss in S/N ratio is not experienced.

Figure 8:
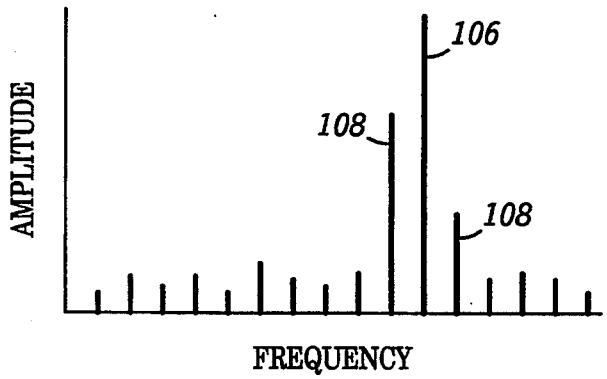
FIGS. 8-9 graphically show exemplary spectral data sets generated by the preferred embodiment of the present invention.
Figure 9:
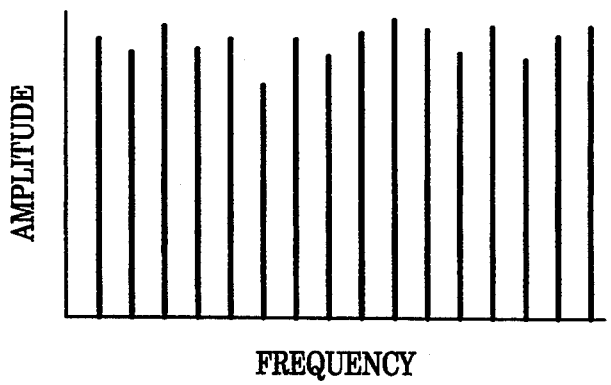

After task 80, DSP 48 performs a task 82 to transform the sample set into the frequency domain and generate a set of spectral data. In the preferred embodiments, this transformation is achieved through a conventional Fast Fourier transformation (FFT) procedure. FIGS. 8 and 9 show exemplary spectral data sets in a graphic format. Such sets of spectral data are saved in memory 52 at a task 84.

After task 84, controller 50 performs a confidence algorithm on this spectral data during a task 86. Due to noise and other considerations, any single FFT may not generate valid results. As will become evident, process 66 combines the results from many different individual low-confidence FFTs into a single set of spectral data which provides, to a high degree of confidence, valid results. Task 86 performs this combining operation. Of course, after only a single FFT has been taken, no combination actually takes place.

The particular algorithm performed by task 86 is not a critical feature in the present invention. For example, process 66 may simply take a predetermined number of FFTs and then average the results. Alternatively, task 86 may analyze the spectral results to detect and discard widely variant results prior to averaging. Further, task 86 may analyze the spectral results and declare valid spectral data whenever two or more FFTs produce substantially similar results or whenever a particular predetermined spectral content is detected. These and other algorithms are well known and are acceptable at task 86.

At a query task 88, process 66 determines whether to loop to take another FFT for use in the confidence algorithm of task 86. Of course, the criteria used to decide whether to loop corresponds to the particular algorithm used in task 86 to combine numerous low-confidence spectral data sets into a single high-confidence spectral data set. When task 88 decides to loop, a task 90 calculates the next origin 74 (see FIG. 7) to use in collecting a sample set during a timing window 72b. Other parameters which specify timing window 72 are not changed. Task 90 may be performed by controller 50 or may be automatically performed by timing circuit 54.

With reference to FIGS. 5 and 7, task 90 calculates the next origin 74 to occur at precisely an integral number (L) of frames 20 (see FIG. 2) after the previous origin 74. That way, the same interval of a frame 20 that was sampled during a previous iteration is sampled again, but in a subsequent frame 20. In the above-discussed first embodiment, where the acquisition signal transmits an unmodulated carrier during segments 27 (see FIG. 3) for a portion of the frames, this integral number preferably corresponds to the number of data-modulated or silent frames which occur between consecutive segments 27 in a given acquisition channel. For the example depicted in FIG. 2, the integer L is three. After task 90, process 66 loops back to task 76, discussed above. Process 66 remains within this loop to take FFTs during windows 72b, 72c, and so on, until task 88 determines that valid spectral data have been obtained for the interval within frames 20 that is defined by timing windows 72.

When task 88 determines that this loop is finished, a query task 92 monitors the single, high confidence, set of spectral data to detect a concentration of energy around a discrete dominant frequency. This situation is illustrated in FIG. 8. With the above-discussed first embodiment of an acquisition signal, it occurs when the timing window 72 specified above in tasks 70 and 90 coincides with segment 27 of the time slot for the acquisition signal. On the other hand, when either modulated random data or no signal at all are processed in windows 72, the energy tends to be uniformly distributed through the spectrum, as illustrated in FIG. 9. Task 92 tests the spectral data against a predetermined threshold to determine whether or not the spectral results more closely resemble the situation depicted in FIG. 8 or FIG. 9.

While FIG. 8 illustrates a concentration of energy around only a single discrete frequency, energy may also be concentrated around multiple discrete frequencies. The discrete frequency about which energy concentrates represents an estimation of Doppler for an acquisition signal. As discussed above, multiple satellites 10 (see FIG. 1) transmit their respective acquisition signals at the same frequency, albeit in different time slots and with different Doppler characteristics. However, antenna arrays 12 (see FIG. 1) do not project perfect antenna patterns, and side lobes are projected in nearby cells 14 (see FIG. 1). Accordingly, for any given time slot 22 (see FIG. 2) station 30 may receive an acquisition signal from more than one satellite 10. Generally speaking, the different acquisition signals exhibit different Doppler signatures due to differences in position and direction of movement of the satellites 10 with respect to station 30. Thus, task 92 also differentiates between multiple dominant frequencies in the spectral data from the uniform distribution shown in FIG. 9.

With reference back to FIG. 5, when task 92 fails to find one or more dominant frequencies in the spectral data set, a task 94 identifies another original origin 74 for another timing window 72a. This time, the origin 74 is set to a value which is not an integral number of frames delayed from the previous original origin 74. Specifically, task 94 sets the new original origin 74 to be delayed from the previous origins 74 by an integral number of frames plus (or minus) a fraction of a frame. As shown on a line 96 of the timing chart presented in FIG. 7, this fractional offset which is added to an integral number of frames shifts timing window 72a within frames 20 so that timing window 72 will now occupy a different interval within frames 20. In fact, this fractional offset is chosen so that after performing task 94 many times, timing window 72 will eventually occupy each possible segment 27 of a transmit time slot 22. After task 94, process 66 loops back to task 76, discussed above. This loop through tasks 92 and 94 continues until timing window 72 coincides with the transmit time slot 22 for an acquisition signal, as shown on a line 98 of FIG. 7. When this occurs, a dominant frequency in the set of spectral data will be detected by task 92, and program control will proceed to a task 100, shown in FIG. 6.

Task 100 saves the spectral data and timing window results. The timing window data provide an accurate time slot definition for the acquisition signal, and the spectral data provide a Doppler estimate for the acquisition signal. After task 100, a task 102 examines this saved data, possibly along with other similar saved data, to determine if the parameters indicated by the saved data suggest that an acceptable acquisition signal's communication channel has been discovered.

The particular acceptability criteria used by task 102 are not critical to process 66, and depend somewhat upon the embodiment of the acquisition signal with which station 30 is being synchronized. For example, when the second embodiment of the acquisition signal, which utilizes a data-modulated carrier, is being used, numerous dominant frequency determinations occur at task 92. In this situation, task 102 may advantageously cause process 66 to loop through many of such determinations and select the Doppler and time slot estimates that correspond to the largest amplitude results. Of course, task 102 may consider the absolute signal strength of the received signal so that weak signals are not processed further.

In either embodiment, these acceptability criteria are preferably based, at least in part, upon the magnitude and sign of the Doppler discovered in the results. All other things being equal, large positive Doppler, as opposed to negative Doppler, acquisition signals are desirable for synchronization because they are transmitted by satellites 10 (see FIG. 1) which are approaching from a large distance. Such approaching, but far off, satellites 10 are more desirable to acquire because they will be in view to station 30 for a longer period of time, and less passing-off between cells 14 is to be expected. Task 102 may advantageously declare that the timing window data and estimated Doppler are acceptable only when a particular Doppler threshold is met, or task 102 may evaluate several sets of such data and select the set with the largest positive Doppler.

Moreover, the acceptability criteria are preferably based, at least in part, upon the circumstances surrounding the invocation of process 66. For example, when a station 30 has been synchronized with a particular satellite 10 and the station 30 temporarily loses the satellite's signal, task 102 may advantageously accept a communication channel which exhibits a Doppler close to the Doppler of the satellite 10 whose signal was temporarily lost. Such acceptability criteria are examples of the sort of factors examined by task 102. Of course, those skilled in the art can devise other factors which may be used to improve overall system performance by selecting only certain acquisition signals for initial synchronization. In addition, it should be noted that an improper decision at task 102 has but a small effect upon system operation. Even if initial synchronization occurs on an improper cell's acquisition signal, final synchronization stages can refine and correct cell assignments.

When task 102 decides that an acceptable acquisition signal's communication channel has not yet been discovered, program control loops back to task 70 to repeat the entire above-discussed portion of process 66. When task 102 decides that an acceptable acquisition signal's communication channel has been discovered, a task 104 extrapolates the frequency of the spectral data set associated with the acceptable acquisition signal. In particular, the energy of the acquisition signal may be smeared over a few discrete frequency bins, as shown in FIG. 8. With reference to FIGS. 6 and 8, task 104 preferably performs a parabolic interpolation of the energies of a frequency bin 106, which contains the maximum energy, and the two bin filters 108 adjacent to it. The precision of the estimated Doppler is enhanced by determining the frequency of the maximum value of a parabola that passes through the amplitude values for bins 106 and 108.

After task 104, a task 110 tunes receiver section 33 to receive the estimated acquisition signal. With reference to FIG. 4, controller 50 provides a frequency value that causes synthesizer 56 to output an oscillation signal corresponding to the estimated frequency of the acquisition signal. In addition, controller 50 provides the timing data to timing circuit 54. The timing data identify a time slot corresponding to the timing window 72 (see FIG. 7) that lead to the discovery of the acceptable acquisition signal.

Next, processing section 46 attempts to digitally demodulate or recover the QPSK encoded data from this estimated acquisition signal at a task 112. Task 114 evaluates the results of the demodulation of task 112. If valid data was recovered, then initial synchronization is complete. If valid data was not recovered, then the frequency and time slot data used above in task 110 are not sufficiently accurate to achieve initial synchronization. Accordingly, a task 116 enhances the frequency estimates to a greater precision, and program control returns to task 110 to again attempt to demodulate data.

The enhancing of frequency estimates is accomplished by utilizing the techniques discussed above. For example, task 82 may be performed, perhaps many times, to obtain other FFTs of the identified portion of the acquisition signal. This time, the FFTs may be configured to resolve the spectrum into a greater number of frequency bins than were used previously. As mentioned above, in the preferred embodiments the frequency is desirably resolved to within 600 Hz out of a possible Doppler shift of ±38 Khz.

Of course, those skilled in the art will appreciate that numerous tradeoffs may be made between tasks 70, 82, 86, 92, 102, and 116. Such tradeoffs can improve the likelihood of success in initially recovering valid data at task 114 without a need for performing task 116. Reducing the need to perform task 116 would speed the synchronization process. However, such a reduction would be achieved at the cost of spending additional time in getting to task 114. For example, if longer duration windows are used, then the likelihood of accurately estimating a time slot improves. However, the longer windows may require more time to process. Likewise, the FFTs taken in task 86 may be designed to resolve the spectrum into more frequency bins to achieve a more accurate initial frequency estimate. Furthermore, the confidence algorithm and acceptability criteria of tasks 86 and 102 may be designed to achieve high confidence by requiring process 66 to spend more time processing received signals. Such factors may be traded-off against the likelihood of performing task 116 and the time required to perform task 116 to optimize the initial synchronization process. Those skilled in the art will appreciate that the above-discussed first embodiment of an acquisition signal (unmodulated carrier) is the more preferable because it will allow process 66 to achieve initial synchronization more quickly than the second embodiment (data-modulated carrier) and may be performed with acquisition signals having lower signal-to-noise ratios. However, regardless of how such tradeoffs are made or which acquisition signal embodiment is selected, synchronization process 66 achieves a faster initial synchronization than is possible using conventional filtering and phase locked loop circuit synchronization techniques.

In summary, the present invention provides an improved synchronization method and apparatus. In spite of a large amount of frequency and time uncertainty and the presence of multiple acquisition signals, the synchronizer of the present invention quickly achieves initial synchronization. When multiple acquisition signals are present, predetermined criteria are used to select the optimum acquisition signal.

The synchronizer of the present invention performs a two-dimensional search, in both frequency and time, to identify this acquisition signal. FFTs are performed to precisely determine time slot characteristics. These FFTs are performed only within a timing window which the synchronizer slides over a TDMA frame. The use of FFTs in estimating time slot data allows multiple acquisition signals having different Doppler characteristics to be distinguished from one another. A natural consequence of the time slot determination and acquisition signal sorting process is that a priori information about Doppler characteristics of a selected acquisition signal is obtained. This a priori information allows the synchronizer of the present invention to then quickly make an accurate determination of Doppler, by interpolation for example, so that communication may then take place.

The present invention has been described above with reference to preferred embodiments. However, those skilled in the art will recognize that changes and modifications may be made in these preferred embodiments without departing from the scope of the present invention. For example, while the preferred embodiments are configured to operate in connection with a space-based cellular radiocommunication system, the teaching of the present invention may be applied to conventional terrestrial cellular communication systems or to other radiocommunication systems. These and other changes and modifications which are obvious to those skilled in the art are intended to be included within the scope of the present invention.

What is claimed:

1. A method for synchronizing a radiocommunication station to a time division multiple access (TDMA) communication signal having an unknown frequency and an unknown time slot within frames of data, said method comprising the steps of:

sampling said communication signal within a timing window having a first origin and within subsequent timing windows having subsequent origins to generate sample sets, each of said sample sets corresponding to one of the timing windows, said subsequent origins having been delayed from said first origin an integral number of frames;

transforming each of said sample sets into a frequency domain to generate sets of spectral data for each of said timing windows;

combining said sets of spectral data into a single set of spectral content data; and determining when said set of spectral content data contains a dominant frequency.

2. A method as claimed in claim 1 wherein:

said unknown time slot of said communication signal has a predetermined duration; and said method further comprises the step of establishing a duration for said timing window, said duration being less than said predetermined duration.

3. A method as claimed in claim 1 wherein the sampling step comprises the steps of:

digitizing said communication signal during said window to generate said sample sets; and the transforming step further comprises the step of performing a fast Fourier transform on said set of samples to generate said sets of spectral data.

4. A method as claimed in claim 1 wherein the determining step comprises the steps of detecting energy concentrated around a discrete frequency and estimating a time slot and frequency for said communication signal, and said method additionally comprises the steps of:

determining whether the estimated communication signal exhibits acceptable parameters for use in synchronizing said radiocommunication station; and when said parameters are determined to be unacceptable, repeating the sampling, transforming, combining and determining steps until the determining step again determines when said set of spectral content contains said dominant frequency.

5. A method as claimed in claim 1 wherein the determining step comprises the steps of detecting energy concentrated around a discrete frequency and signaling the estimation of a frequency channel and a time slot for said communication signal, and said method additionally comprises the steps of:

tuning a receiver portion of said radiocommunication station to receive signals at the estimated frequency channel and during the estimated time slot; and processing the received signals to recover transmitted data.

6. A method as claimed in claim 5 additionally comprising the steps of:

determining whether the processing step successfully recovered said transmitted data from said communication signal; and when said transmitted data was not successfully recovered from said communication signal, enhancing the precision used in determining said discrete frequency around which said energy is concentrated and repeating the tuning and processing steps.

7. A method as claimed in claim 5 additionally comprising the steps of:

determining whether the processing step successfully recovered said transmitted data from said communication signal; and when said transmitted data was not successfully recovered from said communication signal, enhancing the precision used in identifying said estimated time slot and repeating the tuning and processing steps.

8. A method as claimed in claim 1 further comprising the steps of:

identifying, when said spectral content data does not contain said dominant frequency, a subsequent origin for said timing windows, said subsequent origin not being an integral number of frames delayed from said origin of the establishing step; and repeating, until said dominant frequency is determined, the sampling, transforming, combining and determining steps for timing windows identified by said subsequent origin.

9. A method for synchronizing a radiocommunication station to a time division multiple access (TDMA) communication signal having an unknown frequency and an unknown time slot within frames of data, said method comprising the steps of:

establishing an origin for a timing window;

determining the spectral content of said communication signal within said window;

monitoring said spectral content of the determining step;

identifying a subsequent origin for said timing window, said subsequent origin not being an integral number of frames delayed from said origin of the establishing step; and repeating the determining, monitoring, and identifying steps until the monitoring step detects energy concentrated around one or more discrete frequencies, wherein the determining step comprises the steps of:

transforming said communication signal within said window into a frequency domain;

saving said frequency domain results of the transforming step;

calculating a new origin for said window, said new origin being substantially an integral number of frames delayed from said origin of the establishing step;

repeating the transforming, saving, and calculating steps; and combining said results from the repetitions of the saving step into a single set of spectral content data.

10. A method as claimed in claim 9 wherein:

said communication signal comprises a first portion of frames having an unmodulated carrier and a second portion of frames having a carrier modulated by data, said first portion being distributed so that each of said first portion frames is followed by a predetermined integral number of second portion frames; and each repetition of the calculating step sets said new origin to be said predetermined integral number of frames delayed from an origin calculated in an immediately previous repetition of the calculating step.

11. A method as claimed in claim 9 wherein:

said communication signal comprises a carrier signal modulated by transmitted data; and the transforming step comprises the step of stripping said transmitted data from said carrier signal.

12. A method for synchronizing a radiocommunication station to a time division multiple access (TDMA) communication signal having an unknown frequency and an unknown time slot within frames of data, said method comprising the steps of:

establishing an origin for a timing window;

determining the spectral content of said communication signal within said window;

monitoring said spectral content of the determining step;

identifying a subsequent origin for said timing window, said subsequent origin not being an integral number of frames delayed from said origin of the establishing step; and repeating the determining, monitoring, and identifying steps until the monitoring step detects energy concentrated around one or more discrete frequencies wherein:

said frames are configured so that said communication signal occupies one of a discrete number of time slots within said frames, and the identifying step calculates said subsequent origin to be delayed from said origin of the establishing step by an integral number of frames plus a fraction of a frame, said fraction being a value which, when the identifying step is repeated a multiplicity of times, causes said window to reside within each of said discrete number of time slots.

13. A radiocommunication apparatus for synchronizing with a TDMA communication signal having an unknown frequency and an unknown time slot within frames of data, said apparatus comprising:

means for converting a received signal to a baseband signal;

means, coupled to the converting means, for sampling and digitizing said baseband signal to collect sets of digitized samples of said baseband signal, each of said sets of samples being collected during a timing window which begins at a corresponding window origin;

a digital signal processor, coupled to the sampling and digitizing means, for performing fast Fourier transforms upon said sets of samples to generate sets of spectral data;

means for establishing the window origins; and a controller, coupled to said digital signal processor and to the establishing means, said controller being configured to determine when one of said sets of spectral data indicates energy concentrated around a discrete frequency and being configured so that when one of said sets of spectral data indicates energy not concentrated around a discrete frequency, the establishing means is controlled to establish a new origin which is not an integral number of frames delayed from an original origin, wherein said controller comprises:

means for controlling the establishing means so that a plurality of successive sets of spectral data are obtained from a common time interval within a plurality of said frames of data;

means, coupled to said digital signal processor, for storing said plurality of sets of spectral data;

means, coupled to the storing means, for combining said plurality of sets into a single set of spectral data; and means, responsive to said single set of spectral data, for detecting energy concentrated around a discrete frequency.

14. A radiocommunication apparatus as claimed in claim 13 wherein the controlling means is configured to establish new origins as being an integral number of frames delayed from an original origin.

15. A method for synchronizing a radiocommunication station with a TDMA communication signal having an unknown frequency and an unknown time slot within frames of data, said method comprising the steps of:

(a) establishing an original origin of a timing window;
(b) transforming said communication signal within said window into a set of frequency domain data;
(c) saving said frequency domain data of step (b);
(d) calculating a new origin of said window, said new origin being substantially an integral number of frames delayed from said original origin;
(e) repeating steps (b), (c), and (d) a predetermined number of times, said predetermined number based on a number of frames necessary to detect energy concentrated around a discrete frequency;
(f) combining said frequency domain data from each of the repetitions of step (c) into a single set of spectral content data;
(g) monitoring said single set of spectral content data;
(h) identifying another original origin for said timing window, said another original origin not being an integral number of frames delayed from said original origin of step (a); and
(i) repeating steps (b), (c), (d), (e), (f), (g), and (h) until step (g) detects said energy concentrated around said discrete frequency.

16. A method as claimed in claim 15 wherein:
said frames are configured so that said communication signal occupies one of a discrete number of time slots within said frames; and
step (h) calculates said another original origin to be delayed from said original origin of step (a) by an integral number of frames plus a fraction of a frame, said fraction being a value which, when step (h) is repeated a multiplicity of times, causes said window to reside within each of said discrete number of time slots.

17. A method as claimed in claim 16 wherein:
said unknown time slot of said communication signal has a predetermined duration; and
step (a) establishes a duration for said timing window, said duration being less than said predetermined duration.

18. A method as claimed in claim 15 wherein the detection of energy concentrated around a discrete frequency in step (g) signals the estimation of a frequency and time slot for said communication signal, and said method additionally comprises the steps of:
determining whether the estimated communication signal exhibits acceptable parameters for use in synchronizing said receiver; and
if said parameters are determined to be unacceptable, repeating steps (b), (c), (d), (e), (f), (g), and (h) until step (g) detects energy concentrated around a discrete frequency.

19. A radiocommunication apparatus for synchronizing with a TDMA communication signal having an unknown frequency and an unknown time slot within frames of data, said apparatus comprising:

a receiver for sampling said communication signal and collecting sets of the samples, each of said sets of samples being collected during timing windows which begin at corresponding window origins, said window origins being an integral number of frames apart;
a digital signal processor, coupled to said receiver, for transforming said sets of samples into a frequency domain to generate sets of spectral data; and
a controller, coupled to said digital signal processor and to said receiver, said controller being configured to combine said sets of spectral data into a single set of spectral content data, and to determine when said single set of spectral content data indicates energy concentrated around a discrete frequency, and
said controller is further configured so that when one of said sets of spectral content data indicates energy not concentrated around a discrete frequency, a new origin is established which is not an integral number of frames delayed from an original origin, and said controller:
configures said receiver to collect second sets of samples of received signals during subsequent timing windows, said subsequent windows being an integral number of frames from said new origin;
configures said digital signal processor to transform said second sets into said frequency domain to generate second sets of spectral data;
combines said second sets of spectral data into a second single set of spectral content data; and
determines when said second single set of spectral content data indicates energy around said discrete frequency.

20. A method for synchronizing a radiocommunication station with a TDMA communication signal having an unknown frequency and an unknown time slot within frames of data, said method comprising the steps of:

(a) establishing an original origin of a timing window;
(b) transforming said communication signal within said window into a set of frequency domain data;
(c) saving said frequency domain data of step (b);
(d) calculating a new origin of said window, said new origin being substantially an integral number of frames delayed from said original origin;
(e) repeating steps (b), (c), and (d) a predetermined number of times, said predetermined number based on a number of frames necessary to detect energy concentrated around a discrete frequency; and
(f) combining said frequency domain data from each of the repetitions of step (c) into a single set of spectral content data to detect energy concentrated around said discrete frequency.

21. A method for synchronizing a radiocommunication station to a time division multiple access (TDMA) communication signal having an unknown frequency and an unknown time slot within frames of data, said method comprising the steps of:
sampling said communication signal within a set of timing windows;
combining frequency domain data from the sampled signals into a single set of spectral content data; and
repeating the sampling and combining steps for different sets of timing windows until said set of spectral content data contains a dominant frequency, and the combining step comprises determining whether said single set of spectral content data contains said dominant frequency and if not, performing the repeating step until said dominant frequency is detected, said different sets of timing windows delayed a non-integral number of frames from said set of timing windows.

* * * * *